(12) United States Patent
De Pelsemaeker et al.

(10) Patent No.: US 9,835,362 B2
(45) Date of Patent: Dec. 5, 2017

(54) DE-ICING/DEFOGGING DEVICE FOR ELECTRICALLY PROPELLED VEHICLES

(75) Inventors: Georges De Pelsemaeker, Poigny-la-Foret (FR); Kamel Azzouz, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 333 days.

(21) Appl. No.: 14/008,579

(22) PCT Filed: Mar. 30, 2012

(86) PCT No.: PCT/EP2012/055809
§ 371 (c)(1),
(2), (4) Date: Jan. 31, 2014

(87) PCT Pub. No.: WO2012/131047
PCT Pub. Date: Oct. 4, 2012

(65) Prior Publication Data
US 2014/0130519 A1  May 15, 2014

(30) Foreign Application Priority Data

Mar. 31, 2011 (FR) ...................... 11 52691

(51) Int. Cl.
*F25B 21/02* (2006.01)
*F25D 21/00* (2006.01)
(Continued)

(52) U.S. Cl.
CPC ............. *F25B 21/02* (2013.01); *B60H 1/005* (2013.01); *B60H 1/00478* (2013.01)

(58) Field of Classification Search
CPC  B60H 1/00478; B60H 1/005; B60H 1/00492; B60H 1/00385; B60H 1/00392; F25B 21/02; F25B 2400/24; F28D 20/0034; F28D 20/02; F28D 2020/0013; F28D 2020/0069; F28D 2020/0078
(Continued)

(56) References Cited

U.S. PATENT DOCUMENTS

2004/0159119 A1\* 8/2004 Hu ................................. 62/435
2005/0167169 A1\* 8/2005 Gering et al. ............... 180/65.2
(Continued)

FOREIGN PATENT DOCUMENTS

EP  2239158 A1  10/2010

OTHER PUBLICATIONS

PCT International Search Report for PCT/EP2012/055809 dated Aug. 6, 2012, 5 pages.

*Primary Examiner* — Joseph Trpisovsky
(74) *Attorney, Agent, or Firm* — Howard & Howard Attorneys PLLC

(57) ABSTRACT

A device and a method for defogging and/or defrosting a glazing unit of a motor vehicle with a partially or totally electric propulsion system is disclosed. The device comprises means (1) for cooling a coolant fluid, using at least one electric current source, and a thermal battery (2), the device being configured to allow, in certain phases, the cooling of the coolant fluid by the cooling means (1) and the storage of cold from the coolant fluid in the battery (2), and, in other phases, the release of cold from the battery (2) into the coolant fluid.

13 Claims, 2 Drawing Sheets

(51) Int. Cl.
*B60H 1/32* (2006.01)
*B60H 1/00* (2006.01)

(58) Field of Classification Search
USPC ..... 62/3.61, 3.7, 80, 239, 243, 323.2, 323.3, 62/430
See application file for complete search history.

(56) References Cited

U.S. PATENT DOCUMENTS

| | | |
|---|---|---|
| 2005/0284153 A1* | 12/2005 | Price et al. ................. 62/3.7 |
| 2006/0225441 A1 | 10/2006 | Goenka et al. |
| 2007/0017666 A1* | 1/2007 | Goenka et al. ............. 165/202 |
| 2007/0033951 A1 | 2/2007 | Goenka et al. |
| 2010/0274396 A1* | 10/2010 | Yang ................. B60H 1/00385 700/278 |
| 2011/0204655 A1* | 8/2011 | Waibel ...................... 290/1 R |

* cited by examiner

DE-ICING/DEFOGGING DEVICE FOR ELECTRICALLY PROPELLED VEHICLES

RELATED APPLICATIONS

This application is the National Stage of International Patent Application No. PCT/EP2012/055809, filed on Mar. 30, 2012, which claims priority to and all the advantages of French Patent Application No. FR 11/52691, filed on Mar. 31, 2011, the content of which is incorporated herein by reference.

The present invention relates to a device and method for defrosting/defogging a motor vehicle with a partially or totally electric traction system.

BACKGROUND

At the present time, for vehicles with heat engines, the air conditioning system is conventionally composed of a compressor, a condenser and an evaporator. It is generally designed to provide considerable amounts of cold so as to cool the whole atmosphere of the car interior. The power required for the operation of these systems is taken from the engine. Some of the fresh air produced by these air conditioning systems is also used for the defrosting/defogging of the vehicle's windows, the cooled air having lost some of its water vapor during the cooling and therefore being farther from the saturation point than uncooled air.

In electric vehicles, it is considered at present that a maximum of the energy available in the electric batteries should be reserved for the propulsion of the vehicle only, to ensure that the vehicle has a sufficient range. Thus the present invention arose from the idea of separating the comfort functions, such as the air conditioning of the vehicle, from the safety functions such as defrosting/defogging, previously provided, in vehicles with heat engines, by a single system, namely the air conditioning system.

It is therefore useful to devise alternative systems which do not run on the energy of the batteries, or do so only to a small extent, in order to provide cooling functions for the requirements of defrosting/defogging the glazing units.

The problem may arise in a similar way, but to a lesser degree, in hybrid propulsion vehicles, that is to say vehicles propelled by a combination of a heat engine and an electrical machine.

SUMMARY OF THE INVENTION

The invention therefore proposes to provide defrosting/defogging of an electric vehicle by means of a device which can operate independently of the energy stored in the electric batteries for the propulsion of the vehicle or, failing this, by drawing the smallest possible amount of this energy.

For this purpose, the invention relates to a device for defogging and/or defrosting a motor vehicle with a partially or totally electric propulsion system, characterized in that said device comprises means for cooling a coolant fluid using at least one electric current source, and a thermal battery, said device being configured to allow, in certain phases, the cooling of said coolant fluid by said cooling means and the storage of cold from said coolant fluid in said battery, and, in other phases, the release of cold from said battery into said coolant fluid.

Thus, because of the presence of the thermal battery in which the cold can be stored, the defrosting/defogging no longer depends solely on the state of charge of the current source used.

In various embodiments,
the cooling means are thermoelectric cooling devices.
the thermal battery comprises a phase change material whose phase change temperature is in the range from 0 to $-5°$ C. This ensures that the temperature of the coolant fluid will remain below a value such as 8° C., while remaining positive, during the heat exchange used for the defrosting/defogging.
the phase change material is a eutectic whose latent heat of phase change is greater than or equal to 300 kJ/kg. It is preferably chosen so as to be at least equal to 312 kJ/kg.
the device further comprises a heat exchanger through which coolant fluid and a flow of air for the defrosting/defogging of said vehicle can pass, said exchanger enabling a heat exchange to be provided between said air flow and said coolant fluid;
said device comprises three branches for the circulation of said coolant fluid, of which:
  the first branch, called the thermal source branch, comprises the cooling means and the thermal battery in series,
  the second branch, called the defrosting branch, comprises said heat exchanger,
  the third branch is called the charging branch;
said device comprises means for controlling the circulation of the coolant fluid through each of said branches, for the selective provision of:
  serial fluid circulation through the thermal source branch and through the charging branch;
  serial circulation through the thermal source branch and through the defrosting/defogging branch;
said control means are composed of a three-way valve, each of said branches being connected to one of the channels of the three-way valve at one of its ends.

The invention also relates to a method for defrosting/defogging a motor vehicle with a partially or totally electric propulsion system, characterized in that:
means for cooling a coolant fluid, using at least one electric current source, are provided, together with a thermal battery,
in certain phases, cold from said coolant fluid is stored in said battery while said coolant fluid is cooled by said cooling means,
in other phases, the coolant fluid is cooled by releasing cold from said battery into said coolant fluid.

In a first embodiment, a heat exchanger is provided, through which said coolant fluid and a flow of air for the defrosting/defogging of said vehicle can pass, said exchanger enabling a heat exchange to be provided between said air flow and said coolant fluid, and:
in the phases in which said coolant fluid is cooled by the cooling means, the coolant fluid is made to circulate through said cooling means and through said exchanger,
in the phases in which cold is released from said thermal battery, the coolant fluid is made to circulate through said battery and said exchanger.

According to another embodiment of the invention, which may be additional to the first,
a mode in which the vehicle is connected to a domestic electricity supply, called the stationary mode, and a mode in which the propulsion system of the vehicle is active, called the drive mode, are detected,
if said stationary mode is detected, said cooling means are supplied with power from said domestic electricity supply.

Thus a solution is provided in which a current source outside the vehicle is used to increase the vehicle's range without drawing power from the electrical batteries for storing cold in the thermal battery.

In an exemplary embodiment, said cooling means are composed of a thermoelectric cooling device, and the following are provided:

three branches for the circulation of said coolant fluid, of which:
the first branch, called the thermal source branch, comprises the thermoelectric cooling device and the thermal battery in series,
the second branch, called the defrosting/defogging branch, comprises said heat exchanger,
the third branch is called the charging branch,
an electric pump for circulating the coolant fluid through said branches,
an electric fan for forcing the circulation of the air flow through said heat exchanger.

In stationary mode, cold can then be stored in the thermal battery by making the fluid circulate in a serial manner through the charging branch and through the thermal source branch, while power is supplied to the thermoelectric cooling device, and no power is supplied to the fan.

In stationary mode, it is also possible to cool the fluid passing through the heat exchanger by making the fluid circulate in a serial manner through the thermal source branch and through the defrosting/defogging branch, while power is supplied to the thermoelectric cooling device and to the fan.

In drive mode, it is possible to cool the air passing through the heat exchanger by making the coolant fluid circulate in a serial manner through the thermal source branch and through the defrosting/defogging branch, while power is supplied to the fan and no power is supplied to the thermoelectric cooling device.

In drive mode, it is also possible to detect a discharged condition of the thermal battery, and to cool the air passing through the heat exchanger by making the coolant fluid circulate in a serial manner through the thermal source branch and through the defrosting/defogging branch, while power is supplied to the fan and to the thermoelectric cooling device.

BRIEF DESCRIPTION OF THE DRAWINGS

The invention will be more readily understood on consideration of the following description which is provided for guidance only and without limiting intent, accompanied by the appended drawings, in which.

DETAILED DESCRIPTION

Figure 1:
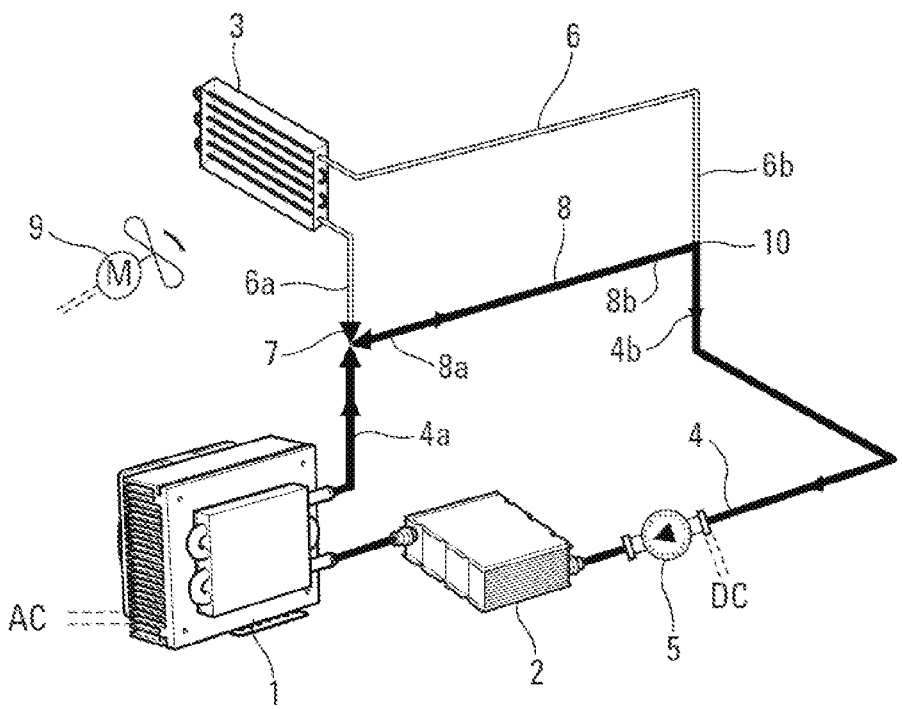
FIG. 1 is a schematic illustration of an embodiment of the device according to the invention, in a first operating mode.
Figure 2:
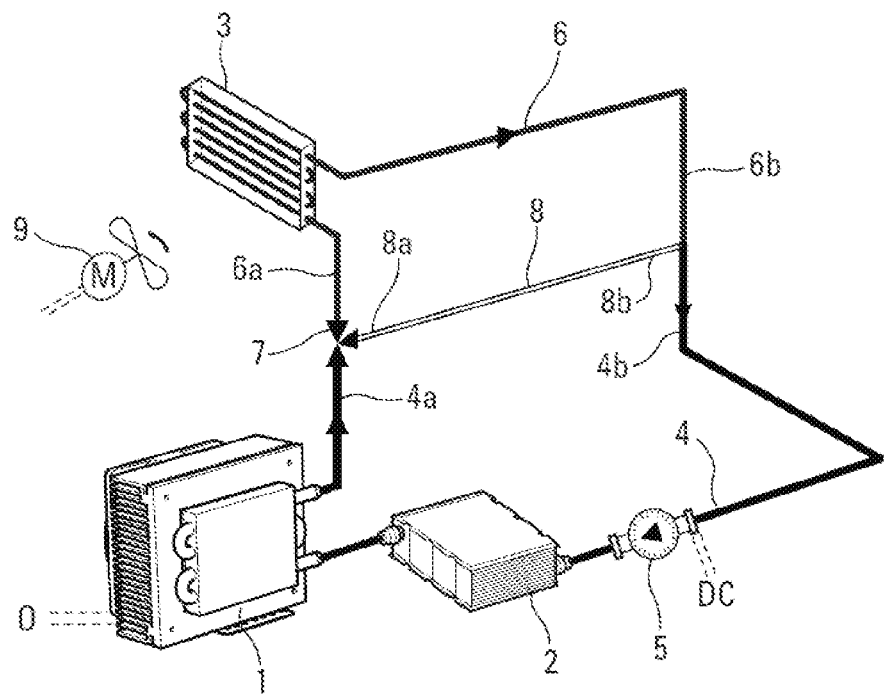
FIG. 2 is a schematic illustration of the device of FIG. 1 in a second operating mode.
Figure 3:
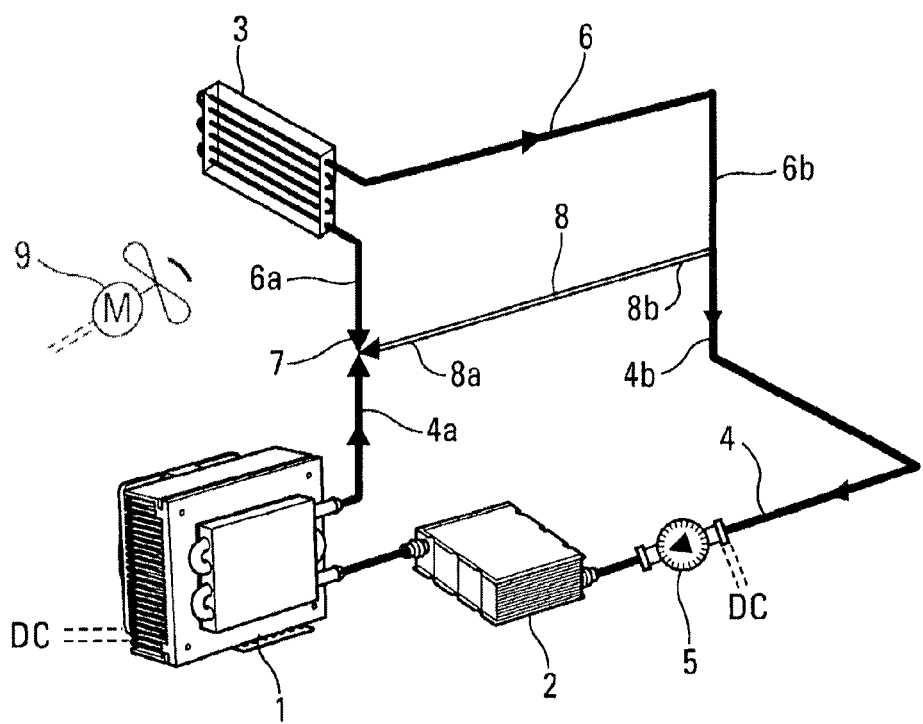
FIG. 3 is a schematic illustration of the device of FIG. 1 in a third operating mode.

As shown in FIGS. 1 to 3, the defrosting/defogging device according to the invention comprises means 1 for cooling a coolant fluid, for example water with added glycol, using at least one electric current source (not shown), and a thermal battery 2 forming a means for storing cold.

Additionally, said device is configured to allow, on the one hand, in certain phases, the cooling of said coolant fluid by said means 1 for cooling the coolant fluid and the extraction of cold from said coolant fluid for storage in said thermal battery, as shown in FIG. 1, and, on the other hand, in other phases, a return of heat (in this case, a release of cold) from said thermal battery into said coolant fluid, as shown in FIGS. 2 and 3.

The cooling means 1 are, for example, a thermoelectric cooling device, operating by the Peltier effect, which uses electrical energy to create temperature differences between two elements, one of which is heated while the other is cooled. A system of this type is markedly more economical in terms of size and energy consumption than a conventional system for producing cold using an on-board cooling machine comprising a compressor, a condenser and an evaporator. It is more suitable for the function of drying the defrosting/defogging air, which it is desirable to provide in response to the stated technical problem.

As regards the thermal battery 2, this may be a latent heat battery. A battery of this type is configured so that the coolant fluid can pass through it. It is also provided with a phase change material (PCM) encapsulated in the battery so that a heat exchange can take place between the PCM and the coolant fluid. The PCM is chosen in such a way that, when the coolant liquid passes through the battery, and this liquid is provided in a sufficiently cold state, that is to say at a temperature below the PCM solidification temperature, the PCM solidifies and therefore surrenders heat by a phase change from liquid to solid, which is equivalent to storing cold. The latent energy of phase change can also be used to cool the coolant fluid by making the latter circulate in the battery when it is at a temperature higher than the melting point of the PCM and the battery has stored sufficient cold.

In order to be most suitable for the defrosting/defogging function, the phase change material, which is encapsulated in tubes in the thermal battery, is chosen so as to have a phase change temperature in the range from 0 to −5° C., and preferably close to −3.7° C., so as to provide a temperature in the heat exchanger within the range from 0 to 8° C. The PCM must also have the highest possible latent heat of phase change in order to provide a high storage density. For this purpose, the material preferred for use is a eutectic having a latent heat of 312 kJ/kg.

The device may further comprise a heat exchanger 3, through which said coolant fluid and the flow of air to be dehumidified can pass, said exchanger enabling a heat exchange to be provided between the defrosting/defogging air and said coolant fluid. The exchanger may be, for example, a cold exchanger of the tube and spacer type, that is to say one comprising a bundle of parallel tubes through which said coolant fluid flows, said tubes being connected at their ends to manifolds which each have an inlet and an outlet for the coolant fluid. Spacers, through which the air flow passes, are provided between the tubes. Said tubes and spacers are configured to cool the air flow which contacts the spacers, using the cold circulating in the tubes.

Said device can be placed in a housing of an air conditioning system (not shown), with a fan or blower 9, enabling an air flow to be forced through said exchanger for use in defrosting/defogging.

According to the illustrated exemplary embodiment, said device according to the invention comprises three branches for the circulation of said coolant fluid.

The first branch 4, called the thermal source branch, comprises the means 1 for cooling the coolant fluid and the thermal battery 2 in series. It may also comprise a pump 5 for the circulation of said coolant fluid, for example a pump fitted in series with the thermal battery 2 and the cooling means 1, notably in this order.

The second branch 6, called the defrosting/defogging branch, comprises said heat exchanger 3.

Said device further comprises means 7 for controlling the circulation of the coolant fluid in each of said branches, for the selective provision of:
 serial fluid circulation through the third branch 8, called the charging branch, and through the thermal source branch 4,
 serial circulation through the thermal source branch 4 and through the defrosting/defogging branch 6.

The control means may be, for example, a three-way valve, each of said branches being connected to one of the channels of the three-way valve at one of its ends 4a, 6a, 8a. Said branches 4, 6, 8 are also interconnected at a common point 10 placed at their ends 4b, 6b, 8b.

Said device is configured to allow the total or partial application of the method according to the invention, which is described below.

According to this method, as mentioned above, in certain phases, cold from said coolant fluid is stored in said battery 2 while said coolant fluid is cooled by said cooling means 1, as shown in FIG. 1. In other phases, the coolant fluid is cooled by releasing cold from said battery 2, as shown in FIGS. 2 and 3. Regardless of the operating phase, the coolant fluid circulates through said cooling means 1. The thermal battery 2 is constantly connected to said cooling means 1 and can be positioned upstream of said cooling means 1, according to the direction of flow of the coolant fluid in the thermal source branch 4, as shown in FIGS. 1 to 3.

In the phases in which cold is returned by said thermal battery 2, the air flow for defrosting/defogging can be cooled by making the coolant fluid circulate through said battery 2 and said exchanger 3, as shown in FIG. 2.

It is also possible to cool the air flow passing through the heat exchanger by making the coolant fluid circulate through said means 1 for cooling the coolant fluid and through said exchanger 3, as shown in FIG. 3.

Thus a mode for storing cold and two modes for cooling the air passing through the heat exchanger 3 are available.

Additionally, a mode in which the vehicle is connected to a domestic electricity supply, called the stationary mode, and a mode in which the propulsion system of the vehicle is active, called the drive mode, are distinguished.

If said stationary mode is detected, said cooling means 1 are supplied with power from said domestic electricity supply to cool said coolant fluid, as shown in FIG. 1.

The term "domestic electricity supply" signifies, for example, the low-tension electric supply of a residence or charging station, such as a three-phase alternating electricity supply providing electric current at 220 V to 240 V and at 50 or 60 Hz between phase and neutral.

On the other hand, in drive mode, said cooling means 1 can be supplied with power from a current source on the vehicle, notably a current source included in the vehicle propulsion system.

This source may be a high-tension electricity system of the vehicle, for example a system providing power at 400 V d.c. and connecting the electric machine which propels the vehicle to batteries known as traction batteries. It may also be a low-tension electricity system of the vehicle, for example a system providing power at 12 V d.c. and serving to supply various electrical components of the vehicle from a low-tension battery.

More generally, in stationary mode the various pieces of electrical equipment included in the defrosting/defogging device according to the invention, such as the pump 5 and/or the fan 9, may be supplied from said domestic current source, whereas in drive mode they are supplied from said vehicle current source.

In greater detail, as shown in FIG. 1, in stationary mode, cold can initially be stored in the thermal battery 2 by making the fluid circulate in a serial manner through the charging branch 8 and through the thermal source branch 4, notably through the three-way valve 7, whose channels connected to said branches 4, 8 are set to be open, while the channel of said valve 7 connected to the defrosting/defogging branch 6 is closed. Additionally, the cooling means 1 are supplied with power from the domestic current source, whereas no power is supplied to the fan 3. The pump 5 is also supplied from the domestic current source.

In drive mode, as shown in FIG. 2, the defrosting/defogging air can be cooled by cooling the air passing through the heat exchanger 3 by circulating the coolant fluid through the thermal source branch 4 and through the defrosting/defogging branch 6, notably through the three-way valve 7, whose channels connected to said branches 4, 6 are set to be open, while the channel of said valve 7 connected to the charging branch 8 is closed. Additionally, the pump 5 and, if necessary, the fan 9 are supplied with power, whereas no power is supplied to the cooling means 1. Thus the current drawn from the electric batteries is minimized, while the cold released from the thermal battery 2 is used.

Also in drive mode, it is possible to detect partial or total discharged conditions of the thermal battery 2, while still cooling the air passing through the heat exchanger 3, by making the coolant fluid circulate in a serial manner through the thermal source branch 4 and through the defrosting/defogging branch 6, notably through the three-way valve 7, whose channels connected to said branches 4, 6 are set to be open, while the channel of said valve 7 connected to the charging branch 8 is closed. Additionally, the pump 5 and the thermoelectric cooling device 1 are supplied with power, together with the fan 9 if necessary. Thus, particularly if the demand for defrosting/defogging is prolonged and if the state of charge of the electric batteries of the vehicle permits, it is possible to prolong the cooling of the defrosting/defogging air, even if the thermal battery 2 has no more cold, or very little cold, to supply.

The invention claimed is:

1. A device for defogging and/or defrosting a motor vehicle with a partially or totally electric propulsion system, wherein said device comprises means for cooling a coolant fluid using at least one electric current source, and a thermal battery, wherein the thermal battery comprises a phase change material whose phase change temperature is in the range from 0 to −5° C. and wherein the phase change material is encapsulated in tubes in the thermal battery, said device being configured to allow, in certain phases, the cooling of said coolant fluid by said cooling means and the storage of cold from said coolant fluid in said battery, and, in other phases, the release of cold from said battery into said coolant fluid,
 wherein said device further comprises a heat exchanger through which said coolant fluid and a flow of air for defrosting/defogging can pass, said exchanger enabling a heat exchange to be provided between said air flow and said coolant fluid,
 wherein said device comprises a first branch, which is further defined as a thermal source branch, comprises the cooling means and the thermal battery in series, and a second branch, which is further defined as a defrosting/defogging branch, comprises said heat exchanger, and wherein said device is configured for serial fluid communication in the thermal source branch and in the defrosting/defogging branch.

2. The device as claimed in claim 1, wherein the cooling means are thermoelectric cooling devices.

3. The device as claimed in claim 1, wherein the phase change material is a eutectic whose latent heat of phase change is greater than or equal to 300 kJ/kg.

4. The device as claimed in claim 1, comprising a third branch, which is further defined as a charging branch for said coolant fluid.

5. The device as claimed in claim 4, comprising means for controlling the circulation of the coolant fluid in each of said branches, for the selective provision of:
   serial fluid circulation in the thermal source branch and in the charging branch, and
   serial fluid circulation in the thermal source branch and in the defrosting/defogging branch.

6. The device as claimed in claim 5, wherein said control means are composed of a three-way valve, each of said branches being connected to one of the channels of the three-way valve at one of its ends.

7. A method for defogging and/or defrosting a glazing unit of a motor vehicle with a partially or totally electric propulsion system, wherein:
   means for cooling a coolant fluid, based on at least one electric current source, are provided, together with a thermal battery, arranged in series with said means for cooling, and a heat exchanger through which said coolant fluid and a flow of air for the defrosting/defogging of said vehicle can pass, said exchanger enabling a heat exchange to be provided between said air flow and said coolant fluid,
   in certain phases, cold from said coolant fluid is stored in said battery while said coolant fluid is cooled by said cooling means,
   in other phases, the coolant fluid is cooled by releasing cold from said battery and sending it to said coolant fluid and is circulated in series through said cooling means and through said exchanger,
   wherein the thermal battery comprises a phase change material whose phase change temperature is in the range from 0 to −5° C. and wherein the phase change material is encapsulated in tubes in the thermal battery.

8. The method as claimed in claim 7, wherein:
   in the phases in which said coolant fluid is cooled by the cooling means, the coolant fluid is made to circulate through said cooling means and through said exchanger, and
   in the phases in which cold is released from said thermal battery, the coolant fluid is made to circulate through said battery and said exchanger.

9. The method as claimed in claim 8, wherein:
   a mode in which the vehicle is connected to a domestic electricity supply, which is further defined as a stationary mode, and a mode in which the propulsion system of the vehicle is active, which is further defined as a drive mode, are detected, and
   if said stationary mode is detected, said cooling means are supplied with power from said domestic electricity supply.

10. The method as claimed in claim 9, wherein said cooling means are composed of a thermoelectric cooling device, and the following are provided:
   three branches for the circulation of said coolant fluid, wherein:
   a first branch, which is further defined as a thermal source branch, comprises said thermoelectric cooling device and the thermal battery in series,
   a second branch, which is further defined as a defrosting/defogging branch, comprises said heat exchanger,
   a third branch, which is further defined as a charging branch,
   an electric pump for circulating the coolant fluid in said branches, and
   an electric fan for forcing the circulation of the air flow through said heat exchanger.

11. The method as claimed in claim 10, wherein, in stationary mode, cold is stored in the thermal battery by making the fluid circulate in a serial manner through the charging branch and through the thermal source branch, while the power is supplied to the thermoelectric cooling device, and no power is supplied to the fan.

12. The method as claimed in claim 10, wherein, in drive mode, the air passing through the heat exchanger is cooled by making the coolant fluid circulate in a serial manner through a thermal source branch and through a defrosting/defogging branch, while power is supplied to the fan and no power is supplied to the thermoelectric cooling device.

13. The method as claimed in claim 10, wherein, in drive mode, a discharged condition of the thermal battery is detected, and the air passing through the heat exchanger is cooled by making the coolant fluid circulate in a serial manner through a thermal source branch and through a defrosting/defogging branch, while power is supplied to the fan and to the thermoelectric cooling device.

* * * * *